United States Patent
Strong et al.

(10) Patent No.: US 8,949,716 B2
(45) Date of Patent: Feb. 3, 2015

(54) ADJUSTING TARGET SIZE OF DISPLAY IMAGES BASED ON INPUT DEVICE DETECTION

(75) Inventors: Robert Strong, Arlington Heights, IL (US); Timothy Bruns, Racine, WI (US); Jeremy Jobling, Grayslake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 3154 days.

(21) Appl. No.: 10/201,185

(22) Filed: Jul. 23, 2002

(65) Prior Publication Data
US 2004/0017401 A1    Jan. 29, 2004

(51) Int. Cl.
| G06F 15/00 | (2006.01) |
| G06F 13/00 | (2006.01) |
| G06F 3/0488 | (2013.01) |
| G06F 3/0481 | (2013.01) |

(52) U.S. Cl.
CPC ............ G06F 3/0488 (2013.01); G06F 3/0481 (2013.01)
USPC .......................................... 715/702; 715/835

(58) Field of Classification Search
CPC .............................. G06F 3/0488; G06F 3/0481
USPC ......... 345/835, 440, 156, 157, 159, 176, 178, 345/173; 715/753, 775, 701–703, 763–765
See application file for complete search history.

(56) References Cited

U.S. PATENT DOCUMENTS

| 4,501,931 | A | * | 2/1985 | Ohya et al. | 345/175 |
| 5,603,053 | A | * | 2/1997 | Gough et al. | 710/5 |
| 5,831,631 | A | * | 11/1998 | Light et al. | 345/440 |
| 5,844,547 | A | * | 12/1998 | Minakuchi et al. | 345/173 |
| 5,963,199 | A | * | 10/1999 | Kato et al. | 345/179 |
| 5,973,693 | A | * | 10/1999 | Light | 345/440 |
| 6,335,746 | B1 | | 1/2002 | Enokida et al. | |
| 6,590,590 | B1 | | 7/2003 | Wen et al. | |
| 6,724,370 | B2 | * | 4/2004 | Dutta et al. | 345/169 |
| 6,967,642 | B2 | * | 11/2005 | SanGiovanni | 715/702 |
| 7,233,321 | B1 | * | 6/2007 | Larson et al. | 345/179 |
| 7,289,614 | B1 | * | 10/2007 | Twerdahl et al. | 379/142.01 |
| 7,533,342 | B1 | * | 5/2009 | Vialle et al. | 715/717 |

FOREIGN PATENT DOCUMENTS

| JP | 08305497 A | 11/1996 |
| TW | 466415 | 12/2001 |
| TW | 495088 | 7/2002 |

OTHER PUBLICATIONS

Notification of the First Office Action of Chinese Patent Application No. 03817734.X, Issued Oct. 27, 2006, 6 pp.
Office Action of the IPO of TW Patent Application No. 92120120, Issued Feb. 10, 2011, 4 pp.

* cited by examiner

Primary Examiner — Kevin Nguyen
(74) Attorney, Agent, or Firm — Shumaker & Sieffert, P.A.

(57) ABSTRACT

A device and method for adjusting the target size of display images based on the detection of an input device is disclosed. The device (10) includes an input device detection circuit (56) operative to provide a detection signal (57) in response to the detection of an input device (36); and a device controller (50) operative to adjust the size of a target (16-26) presented on a display (14) in response to the detection signal (57). The method of the present invention includes detecting the presence of an input device; and adjusting the size of the targets present on a display in response to input device detection.

23 Claims, 6 Drawing Sheets

ADJUSTING TARGET SIZE OF DISPLAY IMAGES BASED ON INPUT DEVICE DETECTION

BACKGROUND OF THE INVENTION

Portable electronic devices, such as palm top computers, hand held computers and personal digital assistants (PDA) are becoming increasingly popular. A typical PDA is a multi-function device including a pressure sensitive LCD display for input and output and a memory. PDA's may employ a text based input interface to allow for fast and easy input. An input device, such as a stylus, is used to input information to and retrieve information from the PDA. The several applications and corresponding functionality provided by the PDA, and the data maintained therein, are stored in the memory. The applications are identified by and presented to the user on the corresponding display as icons.

A drawback associated with current PDA's is that due to the relatively small size of the display, the icons that identify and represent the applications and data are also small in size. Oftentimes, when the user wants to select a particular application, they touch the wrong icon; thereby, activating the wrong or undesired application. Thus, in order to select the desired application or data, the user has to wait until the incorrectly activated application loads and starts before shutting the application down and again trying to select the originally desired application. This is both inefficient and frustrating to the user.

Such user frustration is enhanced, when an input device is not available, for example, when the input device is either lost, not applicable or otherwise improperly calibrated to work with the particular device. In such a situation, the user is left with trying to select and activate a relatively small icon with their fingertip, which is generally larger than the icon. Thus, an attempt to select a single application often results in the user's fingertip touching more than one icon, causing neither corresponding application to be selected.

BRIEF DESCRIPTION OF THE DRAWINGS

The present invention and the corresponding advantages and features provided thereby, will be best understood and appreciated upon review of the following detailed description of the invention, taken in conjunction with the following drawings, where like numerals represent like elements, in which.

DETAILED DESCRIPTION OF THE INVENTION

Briefly stated, the present invention is directed to a device and method for adjusting the size of a target presented on a display which identifies an application, or other information, based on the detection of an input device. The target may be any area of the display and may be represented by an icon or series of icons that identify an application or suitable data, and any active area about the icon or series of icons. According to an exemplary embodiment, the device includes an input device detection circuit operative to provide a detection signal in response to the detection of an input device; and a device controller operative to adjust the size of a target presented on a display in response to the detection signal. The method of the present invention includes detecting the presence of an input device and adjusting the size of the targets present on a display in response to input device detection. For example, the targets are presented in a first size, or aspect ratio, when the input device is attached to the device and are presented in a second size or aspect ratio when the input device is not attached to the device. In this manner, the user can control the size of the targets presented on a display, thereby providing for ease of use of the underlying device or other devices coupled to the display.

In operation, when the input device is either removed or otherwise not present within a corresponding holding mechanism of the device, the targets are adjusted in size in order to provide more applications and/or data on the display; thereby, increasing the number of applications and/or data that may be accessed by the user. On the other hand, when the input device is present in the holding mechanism, the targets are increased in size or aspect ratio; thereby, making it easier for the user to select the proper application or data with a fingertip or other device having a relatively large surface area. By increasing the size of the targets, the user is more easily able to select the desired application or data without using the input device as compared to conventional selection methods.

In an alternate embodiment of the present invention, multiple screen layouts may be stored in a corresponding memory of the device. In this embodiment, a first screen layout is provided to and presented on the display when the input device is present in the holding mechanism. A second screen layout is provided to and presented on the display when the input device is removed from or otherwise not present in the holding mechanism. In this fashion, the user is provided with multiple formats and/or applications to choose from depending upon the detection of the input device. This provides for a more enjoyable and efficient use of the corresponding device as the number of incorrect selections is greatly reduced.

Figure 1:
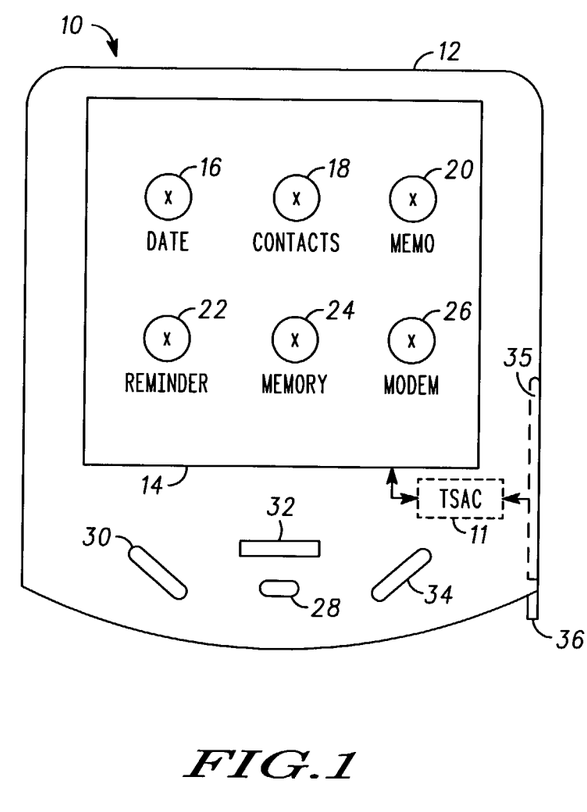
FIG. 1 is a schematic representation of an electronic device incorporating a target size adjustment circuit according to the present invention in a first configuration.

FIG. 1 is a schematic representation of an electronic device 10 employing a target size adjustment circuit 11 operating in accordance with an exemplary embodiment of the present invention. The electronic device 10 can be embodied as any suitable device, including, but not limited to, a cellular telephone, Internet appliance, laptop computer, desktop computer, personal digital assistant (PDA) or any device having or controlling a display. An exemplary device 10 would be the A6188, manufactured by Motorola, Inc, Schaumburg, Ill., the assignee of the present invention. The electronic device 10 includes a housing 12, a touch screen display 14 having a series of targets 16-26 presented thereon, a power button 28, and a plurality of hard keys 30-34 for inputting information to the electronic device 10 and an input device 36. The housing 12 includes a holding chamber 35 configured to maintain an input device 36 substantially therein. The target size adjustment circuit (TSAC) 11 is operatively coupled to the display 14 and the holding chamber 35. The target size adjustment circuit 11 is operative to adjust the size of the targets 16-26 presented on the display 14 or provide alternate target layouts for display based on the detection of the input device 36. The target size adjustment circuit 11 will be discussed in greater detail with reference to FIG. 5. FIG. 1 illustrates a first mode where the input device 36 is contained within the holding chamber 35.

Figure 2:
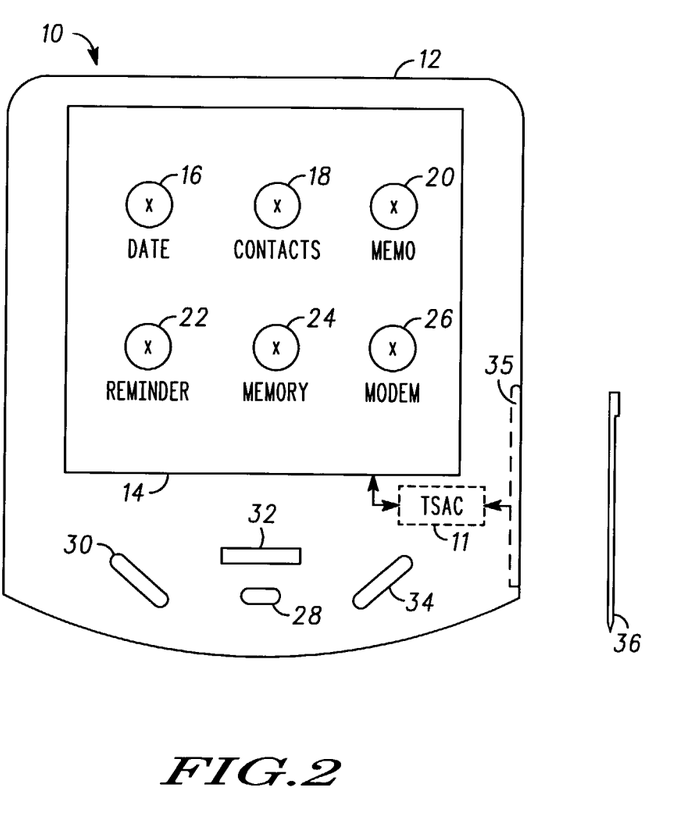
FIG. 2 is a schematic representation of the electronic device illustrated in FIG. 1 in a second configuration.

FIG. 2 illustrates a second mode where the input device 36 is not contained within the holding chamber 35. Alternatively, the holding chamber 35 may be a device separate from the housing 12 or located adjacent to or about the housing 12. As will be discussed in greater detail below, the detection of the input device 36 determines the size of the targets 16-26 presented on the display 14.

The input device 36 is used to select the applications and/or data identified by the targets 16-26 presented on the display 14. The targets 16-26 represent applications and data that may reside within or control the electronic device 10, or any suitable device coupled thereto such as, for example, a screen-based keyboard. The input device 36 may be any apparatus used with PDAs or other suitable electronic devices to select or activate information from a corresponding display, as represented by the targets, or enter information into a corresponding device. Entering information into the electronic device 10 can be performed, for example, by using the input device 36 to tap the keys of a display based keyboard or handwriting recognition software as will be familiar to one of ordinary skill in the art. The specifics of the input modes will not be further discussed herein so as not to obscure the disclosure or deviate from the description of the present invention.

Figure 3:
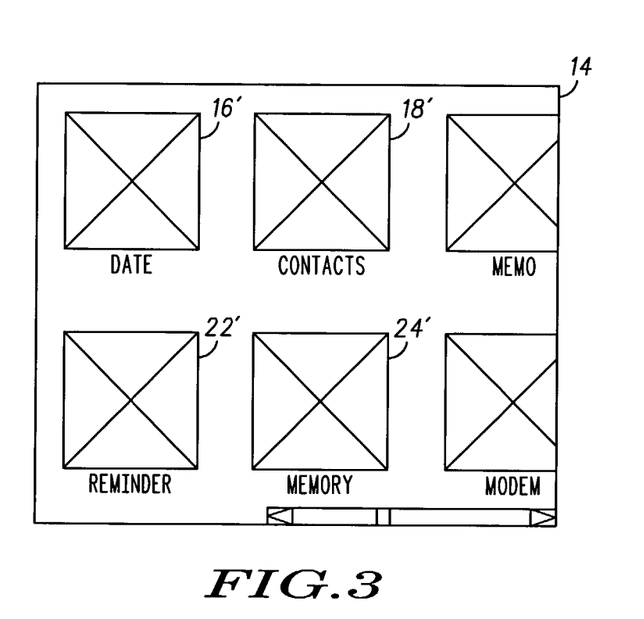
FIG. 3 is an exploded view of a display illustrating the size of targets when the electronic device illustrated in FIG. 1 is in a first mode.
Figure 4:
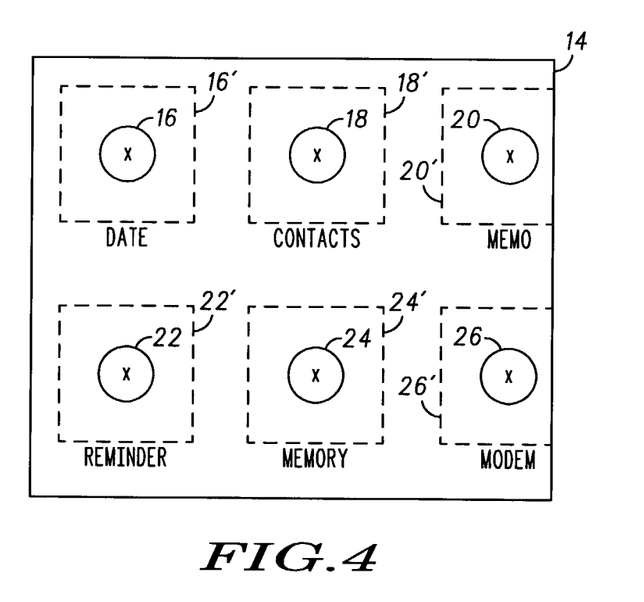
FIG. 4 is an exploded view of a display illustrating the size of targets when the electronic device illustrated in FIG. 1 is in a second mode.

Referring to FIGS. 3 and 4, the targets 16-26 may be any area of the display 14 and may be represented by an icon or series of icons that identify a particular application and/or data and any active area about the icon or series of icons. According to the present invention, all of the active areas on the display 14 are selectable, such that an application may be selected by taping the associated icon or corresponding active area with the input device 36 or, optionally, with a finger.

For example, and referring to FIG. 4, the target corresponding to a datebook (DATE) or scheduling application may include the active area 16' immediately surrounding or about the corresponding icon 16. In this manner, the active area 16' of the target can be larger than the corresponding icon 16. According to the present invention, the larger active area 16' is displayed when the input device 36 is present within the holding chamber 35; thereby, allowing the user to select a target and/or enter information with their finger. On the other hand, when the input device 36 is not present within the holding chamber 35, the target size is adjusted to the smaller icon 16 size allowing for more icons to be presented on the display 14.

Switching between the enlarged (i.e. input device detected) target size and the smaller (i.e. input device not detected) target size may be accomplished by re-sizing the icon 16, the corresponding active area 16' or both the icon 16 and the corresponding active area 16'. According to an exemplary embodiment of the present invention, the re-sizing is accomplished by changing the footprint of the icon. Alternately, the aspect ratio of the target may either be increased or decreased depending on the detection of the input device 36 within the holding chamber 35.

Figure 5:
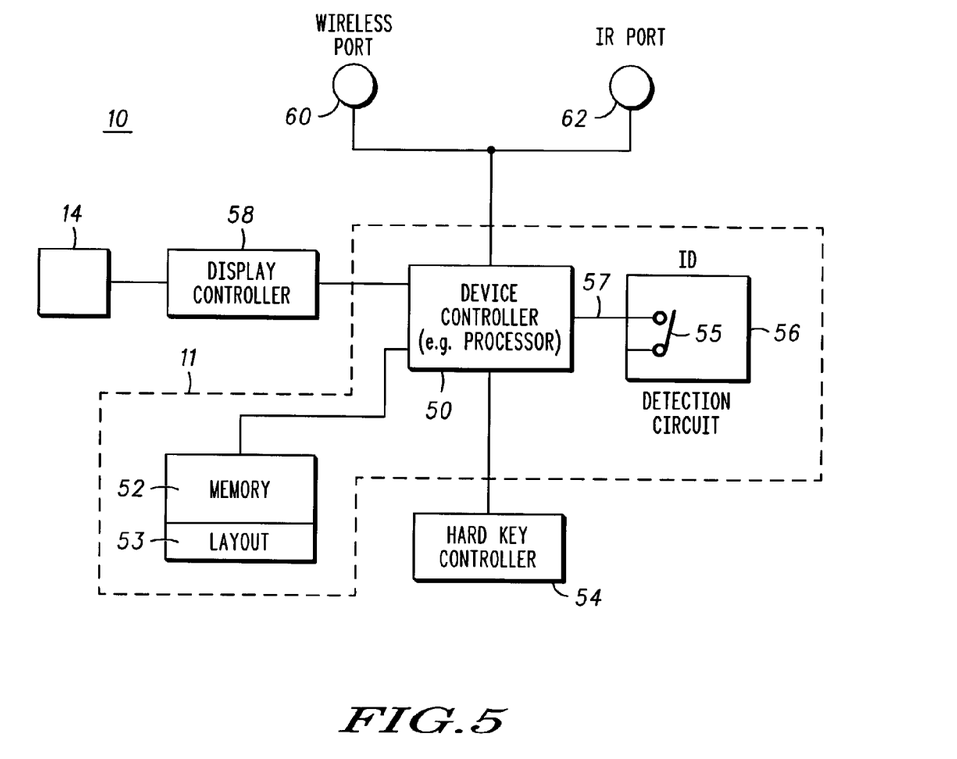
FIG. 5 is a schematic block diagram of the components of the electronic device illustrated in FIG. 1.

FIG. 5 is a schematic block diagram of the components that comprise the electronic device 10 of the present invention. The electronic device 10 includes a device controller 50 which is illustrated as being implemented within a processor, a memory 52 for storing applications and data represented by icons and other program and instructions that are executed by the device controller 50, a hard key controller 54, an input device (ID) detection circuit 56, a display controller 58, a wireless port 60 and an infrared (IR) port 62. The device controller 50, the ID detection circuit 56 and the memory 52 embody the target size adjustment circuit 11 of the present invention. The device controller 50 may be, but is not limited to, a single processor, a plurality of processors, a microprocessor, microcomputer, digital signal processor, state machine, or any device that manipulates signals based on operational instructions or a logic circuit. The memory 52 may include a single memory device or a plurality of memory devices. Such memory devices may be a ROM, RAM, floppy disk, hard drive and/or any storage medium that stores digital information. The memory 52 further includes a layout portion 53, which maintains alternate display screen formats, as will be discussed in greater detail below. The wireless port 60 and the IR port 62 are used to both transmit/receive data from corresponding wireless and IR networks.

The hard key controller 54 provides information to the device controller 50 based on the application of the hard keys 30-34 on the front panel of the electronic device 10. The display controller 58 is operative to properly format and control the presentation of the targets 16-26 and any additional data or images on the display 14.

The ID detection circuit 56, includes a switch 55, which is operative to provide a detection signal 57 to the device controller 50 indicating whether the input device 36 is present within the holding chamber 35. The switch 55 may be a mechanical switch, an optical switch, a digital switch, a capacitance field, or any suitable mechanism that can alternate between at least two states (i.e. open/close), thereby providing an indication of some type of change. According to an exemplary embodiment, the switch 55 of the present invention is a mechanical switch which is in a closed position when the input device 36 is present within the holding chamber 35. When the switch 55 is closed, the detection signal 57 is provided to the device controller 50 indicating the input device 36 is present with the holding chamber 35. In converse fashion, when the input device 36 is removed, or otherwise not present within the holding chamber 35, the switch 55 becomes open (as illustrated), thereby cutting off the detection signal 57.

In response to the detection signal 57, the device controller 50 through the display controller 58 provides for the targets having the enlarged size, as illustrated in FIG. 3, suitable for selection with a finger. When the detection signal 57 is no longer detected, indicating that the input device 36 is not present within the holding chamber 35, the device controller 50 through the display controller 58 adjusts the size of the targets downward, thereby providing for the display of the smaller icons as illustrated in FIG. 4. Thus, the detection of the input device 36 within the holding chamber 35 determines whether the targets 16-26 are presented in an enlarged size (FIG. 3) or in a smaller size (FIG. 4) on the display 14. Although the targets 16-26 are described as switching from a larger size to a smaller size, one of ordinary skill in the art will recognize that the size of the targets may be adjusted from a smaller size to a larger size depending upon the operation. The method for adjusting the size of the targets presented on a display will now be discussed in greater detail with respect to FIG. 6.

Figure 6:
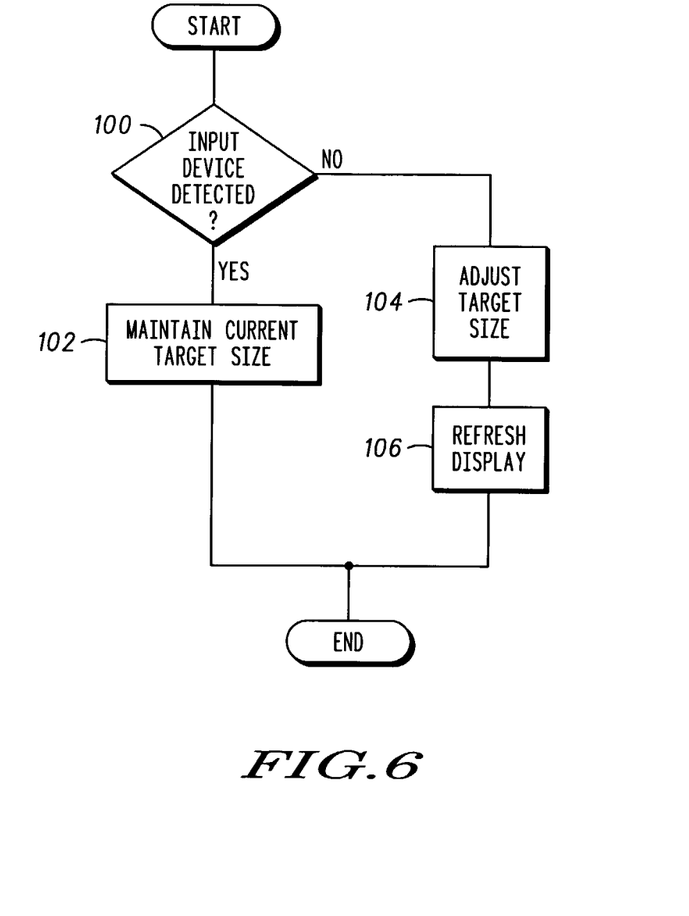
FIG. 6 is a flow chart illustrating the target size adjustment method according to an exemplary embodiment of the present invention.

FIG. 6 is a flowchart of the operating steps of the target size adjustment method according to an exemplary embodiment of the present invention. The operating steps may be stored as program instructions within the memory 52, which may then executed by the device controller 50 or may be implemented as a specially designed logic circuit (e.g. ASIC). The process begins in step 100 where a determination is made as to whether the input device is detected. If the input device is detected, the process continues to step 102 where the current target size is maintained. On the other hand, if the input device is not detected, the process continues to step 104.

In step 104, the target size is adjusted. This could be accomplished by either decreasing the footprint of the underlying icons, or decreasing the aspect ratio of the icons.

In step 106, the display is refreshed; thereby causing the resized targets to be presented on the display. After performing steps 102 or steps 106, the process ends.

Thus, as described above, if the input device 36 is detected as being within the holding chamber 35, the targets 16-26 presented on the display 14 will have an enlarged size to accommodate activation by a finger. If the input device 36 is removed from, or otherwise not detected as being present within the holding chamber 35, the targets 16-26 will be resized to accommodate for activation by the input device 36. In this manner, information can be entered into the electronic device 10 via a fingertip or the input device 36.

Figure 7:
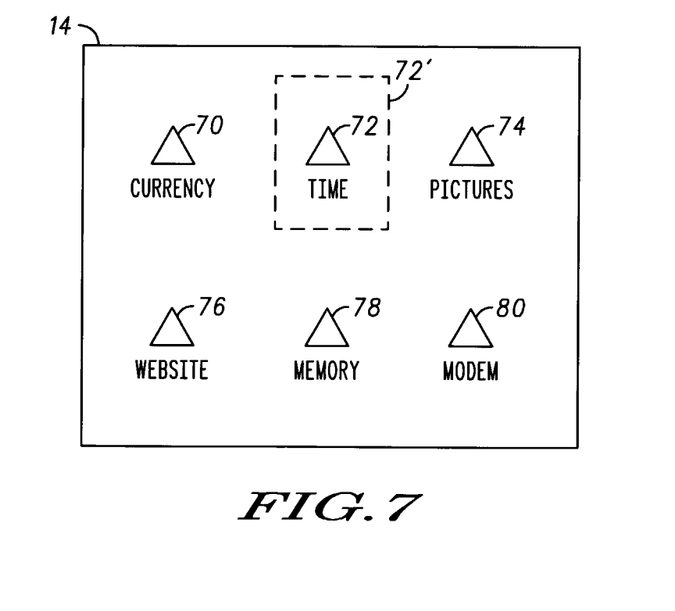
FIG. 7 is an exploded view of a display illustrating an alternate target layout when the electronic device illustrated in FIG. 1 is in the second mode.

FIG. 7 is an exploded view of the display 14, where an alternate layout format is shown. The illustrated and other alternate layouts may be stored in layout memory 53 or rendered as needed. This alternate layout includes a plurality of targets 70-80, providing different applications and/or functionality than those described above with respect to FIGS. 3 and 4. As illustrated, the targets may be comprised of a smaller sized icon identifying a particular application or data, as represented by the TIME icon 72 or a corresponding active area 72' immediately surrounding or about the corresponding icon 72. According to an alternate embodiment of the present invention, this alternate screen layout may be presented on the display 14 based on the detection of the input device 36 as illustrated in FIG. 8.

Figure 8:
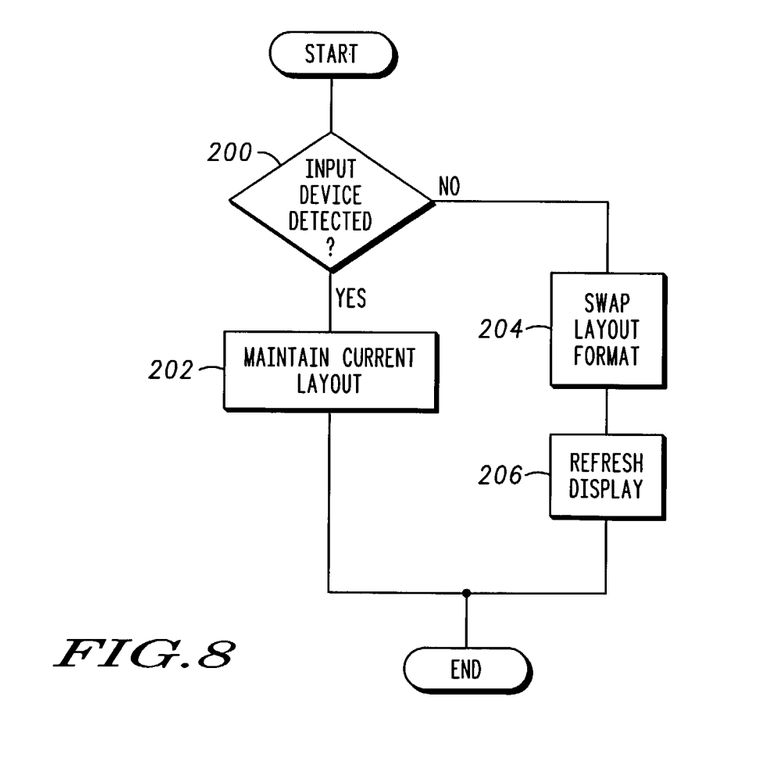
FIG. 8 is a flow chart illustrating a target layout swapping method according to an alternate embodiment of the present invention.

FIG. 8 is a flowchart of the operating steps of an alternate method of the present invention, where the layout presented on the display 14 is swapped based on the detection of an input device. The process begins at step 200 where a determination is made as to whether the input device is detected. If the input device is detected, the current display layout is maintained on the display 14 in step 202. On the other hand, if the input device is not detected, the process continues to step 204.

In step 204, the layout format is swapped. This may be accomplished by exchanging a first layout stored at memory 53 with another layout stored therein.

In step 206, the new layout is presented on the display 14 through the display controller 58. Thus, in this alternate method, a completely new target layout is presented on the display, based on the detection and presence of the input device 36 in the holding chamber 35.

The above detailed description of the invention and the examples described therein have been presented for the purposes of illustration and description. It is therefore contemplated that the present invention cover any and all modifications, variations or equivalents that fall within the spirit and scope of the basic underlying principles disclosed above and claimed herein.

What is claimed is:

1. A method, comprising:
    detecting a change in a presence or an absence of a non-finger input device within an input device holding chamber, wherein the detecting comprises providing a detection signal indicating whether or not the input device is present within the input device holding chamber; and
    adjusting a size of targets presented on a display in response to the detecting, wherein the adjusting is based on the change in the presence or the absence of the input device within the input device holding chamber.

2. The method of claim 1, wherein adjusting the size of the targets includes resizing an aspect ratio of the targets.

3. The method of claim 1, wherein the targets are icons having scalable sizes.

4. The method of claim 1, wherein detecting the change in the presence or the absence of the input device includes detecting a state of an input device detection circuit.

5. The method of claim 4, wherein the input device detection circuit is a switch that alternates between a closed state and an open state.

6. The method of claim 5, wherein the targets each have a first size when the switch is in the closed state, and a second size when the switch is in the open state.

7. The method of claim 5, wherein the targets each have a first aspect ratio when the switch is in the closed state, and a second aspect ratio when the switch is in the open state.

8. The method of claim 5, further comprising providing a first layout when the switch is in the closed state.

9. The method of claim 5, further comprising providing a second layout when the switch is in the open state.

10. A method, comprising:
    receiving a detection signal indicating a detection of a change in a presence or an absence of a non-finger input device within an input device holding chamber; and
    adjusting a size of icons presented on a display in response to the receiving, wherein the adjusting is based on the change in the presence or the absence of the input device within the input device holding chamber, and wherein the icons are each presented in a first size or a second size.

11. The method of claim 10, wherein adjusting the size of the icons further includes presenting the icons in the first size when the detection signal indicates the detection of the input device.

12. The method of claim 10, wherein adjusting the size of the icons further includes presenting the icons in the second size when the input device is not detected.

13. A device, comprising:
    a processor; and
    a memory coupled to the processor, the memory including instructions that when executed cause the processor to:
    (a) receive a detection signal representing a change in a presence or an absence of a non-finger input device within an input device holding chamber; and (b) adjust a size of icons to be presented on a display in response to receiving the detection signal, wherein the adjusting is based on the change in the presence or the absence of the input device within the input device holding chamber.

14. The device of claim 13, wherein the detection signal is provided by an input device detection circuit located about the holding chamber operative to determine the presence of the input device.

15. The device of claim 14, wherein the input device detection circuit is a switch.

16. The device of claim 15, wherein the switch is one of: a mechanical switch, an optical switch, a digital switch or a capacitance field.

17. The device of claim 13, wherein the memory further includes instructions that when executed cause the processor to swap a first screen layout for a second layout in response to receiving the detection signal.

18. A device, comprising:
an input device detection circuit operative to provide a detection signal in response to a detection of a change in a presence or an absence of a non-finger input device within an input device holding chamber, wherein the detection signal indicates whether or not the input device is present within the input device holding chamber; and
a device controller operative to adjust a size of a target presented on a display in response to the detection of the change in the presence or the absence of the input device within the input device holding chamber.

19. The device of claim 18, wherein the input device detection circuit is a switch.

20. The device of claim 19, wherein the switch is selected from the group consisting of: a mechanical switch, an optical switch, a digital switch and a capacitance field.

21. The device of claim 18, wherein the device controller provides the target in a first size when the input device is detected within the input device holding chamber and a second size when the input device is not detected within the input device holding chamber.

22. The device of claim 18, wherein the device controller provides the target in a first aspect ratio when the input device is detected within the input device holding chamber and a second aspect ratio when the input device is not detected within the input device holding chamber.

23. A method, comprising:
detecting a change in a presence or an absence of a non-finger input device within an input device holding chamber, wherein the detecting comprises providing a detection signal indicating whether or not the input device is present within the input device holding chamber; and
changing from a first screen layout to a second screen layout presented on a display in response to the detecting, wherein the adjusting is based on the change in the presence or the absence of the input device within the input device holding chamber.

* * * * *